US007471870B2

(12) United States Patent
Bradstreet et al.

(10) Patent No.: US 7,471,870 B2
(45) Date of Patent: Dec. 30, 2008

(54) TIME-SHIFTING AND SYNCHRONIZING CONTENT AND ENHANCED FILE-BASED STATE DATA

(75) Inventors: John Bradstreet, Sammamish, WA (US); Matthijs A. Gates, Seattle, WA (US); Thaddeus C. Pritchett, Edmonds, WA (US)

(73) Assignee: Microsoft Corporation, Redmond, WA (US)

( * ) Notice: Subject to any disclaimer, the term of this patent is extended or adjusted under 35 U.S.C. 154(b) by 1409 days.

(21) Appl. No.: 10/205,995

(22) Filed: Jul. 25, 2002

(65) Prior Publication Data

US 2004/0017999 A1    Jan. 29, 2004

(51) Int. Cl.
*H04N 5/76* (2006.01)
*H04N 7/00* (2006.01)
(52) U.S. Cl. .......................................... 386/46; 386/95
(58) Field of Classification Search .................. 386/46, 386/95, 83; 725/110, 112, 1
See application file for complete search history.

(56) References Cited

U.S. PATENT DOCUMENTS

| | | | | |
|---|---|---|---|---|
| 6,393,198 | B1* | 5/2002 | LaMacchia | 386/54 |
| 6,571,392 | B1* | 5/2003 | Zigmond et al. | 725/110 |
| 6,901,603 | B2* | 5/2005 | Zeidler et al. | 725/39 |
| 7,197,715 | B1* | 3/2007 | Valeria | 715/747 |
| 2002/0046407 | A1* | 4/2002 | Franco | 725/110 |
| 2002/0144262 | A1* | 10/2002 | Plotnick et al. | 725/32 |
| 2002/0147984 | A1* | 10/2002 | Tomsen et al. | 725/109 |
| 2002/0184646 | A1* | 12/2002 | Lord | 725/109 |
| 2003/0163832 | A1* | 8/2003 | Tsuria et al. | 725/135 |
| 2004/0139475 | A1* | 7/2004 | Zenoni | 725/113 |

OTHER PUBLICATIONS

Kyoung-ill Kim, et al., "Implementation fo the Digital Data Broadcasting System", Proceedings of SPIE vol. 4209, pp. 201-290 and two (2) pgs. cover sheet, Copyright 2001.
J. Stienhorn, et al., "Enhancing TV with ATVEF", Embedded Systems Programming, pp. 55-58, 60, 62, 64 and one unnumbered sheet, Oct. 1999.
Gomer Thomas, "Serving Up Data for Enhanced DTV Programs", SMPTE Journal, pp. 299-303, May 2001.

* cited by examiner

*Primary Examiner*—Thai Tran
*Assistant Examiner*—Gelek Topgyal
(74) *Attorney, Agent, or Firm*—Workman Nydegger (57) ABSTRACT

A computing system such as a Programmable Video Recorder (PVR) receives broadcast data and enhanced file-state data from a data source. The broadcast data may include multimedia data. The enhanced file-state data may include web-based data such as ATVEF data. The PVR buffers the broadcast data and the enhanced file-state data in a backing store that is associated with the PVR. The PVR also creates an index for indexing the enhanced file-state data so that, when the broadcast data is rendered, the correct file-state data can be located and rendered at the appropriate time with the broadcast data. The index may classify the enhanced file-state data by GUID, sequence number, and valid start and end times associated with corresponding broadcast data. The index may also include pointers for locating the enhanced file-state data from the buffer of the PVR.

57 Claims, 4 Drawing Sheets

TIME-SHIFTING AND SYNCHRONIZING CONTENT AND ENHANCED FILE-BASED STATE DATA

BACKGROUND OF THE INVENTION

1. The Field of the Invention

The present invention is directed to rendering enhanced and interactive file-based data and, more particularly, to rendering enhanced file-based state information in a time-shifted manner.

2. Related Technology

The computer and television industries are making large strides in developing technology that will enable a single device to provide the dual functionality of the computer and the television. For instance, the computer is becoming more adept at rendering audio and video data in a manner that simulates the broadcast infrastructure of the television industry. Likewise, the television and computer industries are developing new standards that enable web-based content to be broadcast to the television.

Two emerging standards for broadcasting enhanced, interactive, web-based content include the Advanced TeleVision Forum (ATVEF) standard and the Broadcast HTML standard. Currently, the computer and television industries are working on developing suitable receivers and broadcasting devices for enabling the broadcast of web-based content to the television set.

One problem with broadcasting enhanced and interactive file-based content, however, is that file-based state information may become invalidated when the broadcast of the program is rendered in a time-shifted manner. A program is rendered in a time-shifted manner, for instance, when the program is played at either a different time or in a different sequence than it was recorded.

One device that has been configured to enable this time-shifting functionality is the Programmable Video Recorder (PVR). The PVR may, for instance, record broadcast data into a temporary buffer and then later play the recorded data from the temporary buffer. One advantage of the PVR, over other devices like the VCR, is the ability of the PVR to record data at the same time other data is read and rendered from the temporary buffer. Accordingly, a viewer may use the PVR to watch previously recorded programming at the same time new programming is being recorded.

The PVR also enables a viewer who is watching a live broadcast to temporarily pause the display of the broadcast and then to later resume watching the broadcast at the point it was paused. This is possible because the PVR continuously records the broadcast to the buffer even while the program is being paused. While the program is temporarily paused, the viewer may choose to watch a replay of a desired segment. In a recorded program, the viewer may also choose to skip forward over undesirable segments, such as commercials, for instance.

However, the functionality of enabling the viewer to skip over portions of the recorded broadcast may result in the invalidation or failure to recognize certain enhanced file-based state data that may be embedded within the broadcast. For instance, in one embodiment, the broadcast may include a baseball game that is transmitted with enhanced file-based state data, such as ATVEF data, for maintaining a live scoreboard of the game. After each score or inning new file-based state data may be transmitted to update the scoreboard so that the state of the game may be correctly reflected. However, if the entire game has been recorded and the viewer only begins watching the game in the middle of the fourth inning, for example, then the scoreboard may incorrectly reflect the most recently received scoreboard state information (e.g., the final score information), rather than the fourth inning scoreboard state information.

In another embodiment, enhanced file-based state data is received during the broadcast of commercials. This may be done, for instance, to provide ample time for processing the enhanced data so that it can be displayed as soon as the commercials end. In the present embodiment, the enhanced data may include ATVEF data that provides end of inning statistics on the teams and players. However, if the viewer decides to skip over the commercials, then the statistical data may not be read and properly updated by the PVR, thereby preventing the data from being rendered at the appropriate time with respect to the program.

Yet another problem experienced when recording enhanced file-based state data is that ATVEF standards result in some of the same data being transmitted redundantly. In particular, ATVEF data files are typically placed into one or more packages that are each uniquely identified by a GUID (Global Unique Identifier). Prior to being transmitted, each of these packages is broken up into "N" packets and "M" packets that are labeled by the GUID, the total number of packets in the GUID, and a their unique sequence in the GUID. This enables the ATVEF data files to be reconstructed upon being received. The M packets are typically transmitted redundantly in case some of the packets are not received.

Sometimes more than a single copy of an M packet is received. The redundant M packets may be stored within the temporary buffer with the other broadcast data. However, storing duplicative M packets represents a waste of resources and storage space, particularly when considering the finite storage capacity of the PVR buffer.

BRIEF SUMMARY OF THE INVENTION

The present invention is directed to improved methods, systems and computer program products for rendering enhanced and interactive file-based data in a time-shifted manner.

According to one aspect of the invention, a computing system such as a Programmable Video Recorder (PVR) receives broadcast data and enhanced file-based state data from a data source. The broadcast data may include multimedia data as well as other enhanced file-state data. The enhanced file-based state data may include ATVEF data, broadcast HTML data, and other web-based data. According to one embodiment, the enhanced file-based state data and the broadcast data correspond to the same presentation, although they may be received at different times.

The PVR buffers the broadcast data and the enhanced file-based state data in a backing store that is associated with the PVR. The PVR also creates an index for associating the enhanced file-based state data with the broadcast data so that the correct file-based state data can be located and rendered at the appropriate time with the broadcast data. The index may classify the enhanced file-based state data by GUID, sequence number, and valid start and end times associated with corresponding broadcast data. The index may also include pointers for locating the enhanced file-based state data from the buffer of the PVR.

When a request to render the broadcast data is received, the PVR references the index and identifies the correct enhanced file-based state data, if any, that should be rendered with requested broadcast data. The correct enhanced file-based state data and corresponding broadcast data is then provided to any appropriate devices that may be used to render the enhanced file-based state data and corresponding broadcast data. According to one aspect of the invention, the index enables the correct enhanced file-state information to be rendered with the corresponding broadcast data. According to another aspect of the invention, the index helps to speed presentation of the multimedia data when randomly seeking within the presentation by helping to quickly locate associated data that is already assembled, rather than having to reassemble the associated data.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to methods, systems and computer program products for storing streamed multimedia data in a manner that enables the multimedia data to be accessed from a file requiring an appended index, and while the file is being written to.

According to one aspect of the invention, a computing system such as a Programmable Video Recorder (PVR) receives streaming broadcast data and enhanced file-based state data from a data source. The term "broadcast data," which is broadly defined herein, may include any data that is intended for sequential presentation. Nonlimiting examples of broadcast data include multimedia audio and video data, television (TV) broadcast data, movie broadcast data, music broadcast data, light show broadcast data, slide show broadcast data, and so forth. Broadcast data may also include metadata and enhanced file-based data.

The terms "enhanced file-based state data," "enhanced data," and "file-state data," which are used interchangeably herein, may include ATVEF data, Broadcast HTML data, and other web-based data. The broadcast data and the enhanced file-state data may be transmitted to the PVR in a streaming format, such as the Advanced Streaming Format (ASF), Windows Metafile Format (WMF), or any other streaming format.

According to one embodiment, the PVR is configured to index the enhanced file-state data with respect to corresponding broadcast data and according to an intended synchronization of the file-state data with the broadcast data. When the broadcast data is time-shifted (e.g., when the broadcast data is played at a different time than it is recorded), then the indexed file-state data is identified and played with the corresponding broadcast data.

The embodiments of the present invention may comprise a general-purpose or special-purpose computing system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, which is accessible by a general-purpose or special-purpose computing system. By way of example, and not limitation, such computer-readable media can comprise physical storage media such as RAM, ROM, EEPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computing system.

The term "network," as defined herein, includes any architecture where two or more computing systems may exchange data with each other. When information is transferred or provided over a network or another communications link (either hardwired, wireless, or a combination of hardwired or wireless) to a computing system or computer device, the link is properly viewed as a computer-readable medium. Thus, any such link is properly termed a computer-readable medium. Combinations of the above should also be included within the scope of computer-readable media. Computer-executable instructions comprise, for example, instructions and data which cause a general-purpose computing system or special-purpose computing system to perform a certain function or group of functions.

The term "computing system," as described herein, is defined as one or more software modules, one or more hardware modules, and any combinations thereof that work together to perform operations on electronic data. For example, the computing system may include hardware components, as well as software modules for executing computer-executable instructions. The computing system may also include one or more computers coupled via a computer network. Likewise, the computing system may include a single physical device (such as a Programmable Video Recorder "PVR") where internal modules work together to perform operations on electronic data.

Those of ordinary skill in the art will appreciate that the invention described herein may be practiced in network computing environments with many types of computing system configurations, including personal computers, laptop computer, hand-held devices, multi-processor systems, microprocessor-based or programmable consumer electronics, network PCs, minicomputers, mainframe computers, mobile telephones, PDAs, and the like. The invention may also be practiced in distributed computing environments where local and remote computing systems, which are linked (either by hardwired links, wireless links, or by a combination of hardwired or wireless links) through a communication network, both perform tasks. In a distributed computing environment, program modules may be located in both local and remote memory storage that is either volatile or non-volatile.

Figure 1:
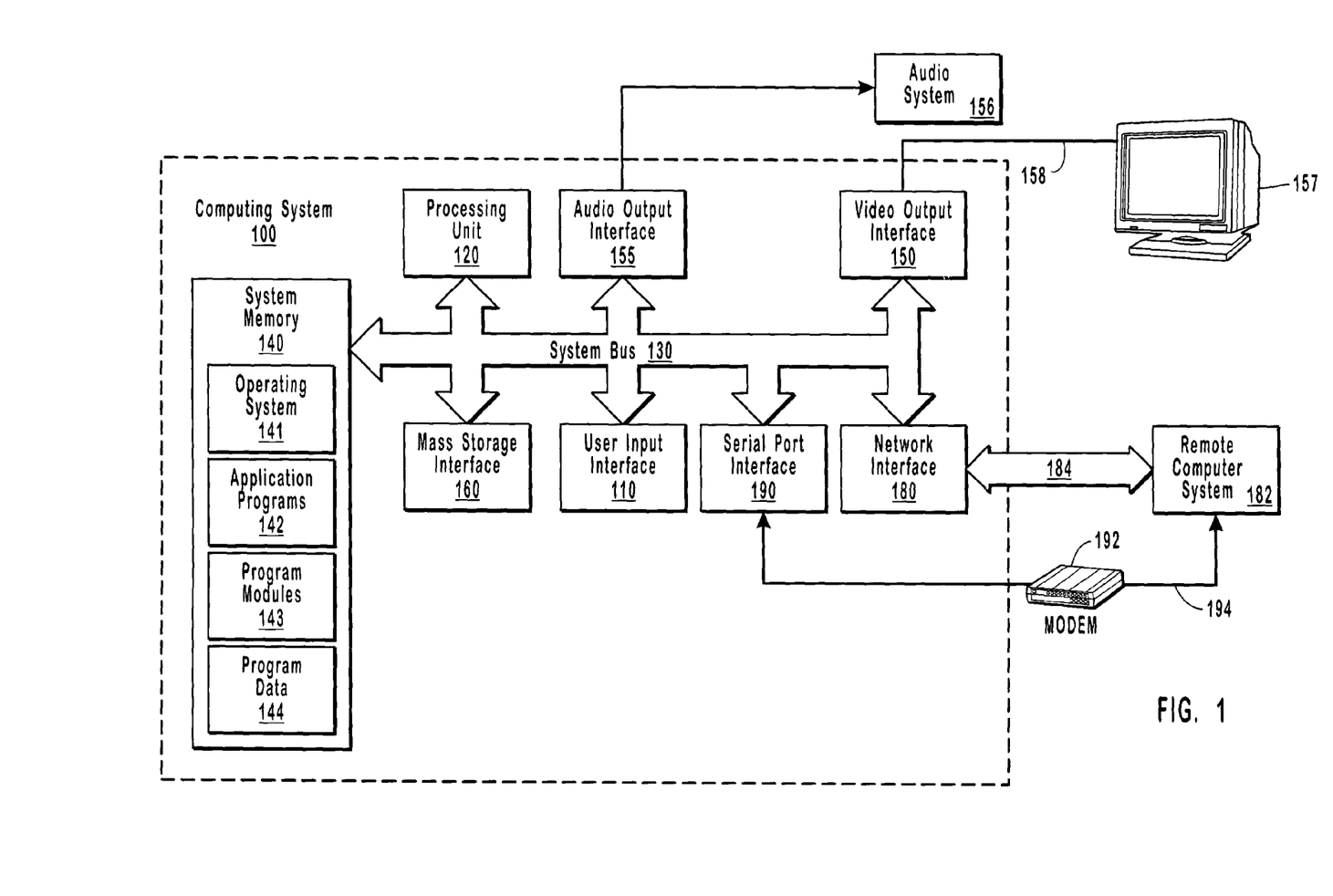
FIG. 1 illustrates an example of a computing system that provides one suitable operating environment for practicing the present invention.

With reference to FIG. 1, an example of a computing system 100 that may be used to implement the principles of the invention is illustrated. According to one embodiment, the computing system 100 may be a PVR that has been adapted to perform the operations that are disclosed herein.

FIG. 1 and the following discussion are intended to provide a brief, general description of one example of a suitable computing environment in which the invention may be implemented. Although not required, the invention will be described in the general context of computer-executable instructions, such as program modules, being executed by computing systems. Generally, program modules include routines, programs, objects, components, data structures, and the like, which perform particular tasks or implement particular abstract data types.

As shown, computing system 100 may include user input interface 110, which may receive information from an input device such as, for example, a keyboard, mouse, microphone, or remote control. An input device may be coupled to user input interface 110 so as to enable the entry of information. An input device may transfer information over such a coupling in response to preprogrammed data or user manipulation of the input device.

Computing system 100 includes processing unit 120, which may allow for complex and flexible general-purpose processing capabilities. Processing unit 120 may execute computer-executable instructions designed to implement features of computing system 100, including features of the present invention. Processing unit 120 is coupled via system bus 130, which also interconnects various other system components, such as system memory 140. System memory 140 generally represents a wide variety of volatile and/or non-volatile memories and may include types of memory previously discussed. However, the particular type of memory used in computing system 100 is not important to the present invention. Program code means comprising one or more program modules may be stored in system memory 140. The one or more program modules may include an operating system 141, one or more application programs 142, other program modules 143, and program data 144.

Computing system 100 may also include video output interface 150, which may provide a video output signal to external video display devices, such as monitor 157. Computing system 100 may be integrally positioned with or separate from a video display device such as monitor 157. Monitor 157 may be configured to display items of different sizes and to display items in different colors. Monitor 157 may be further configured to appropriately update displayed items that change in size and/or color dynamically. Monitor 157 may be coupled to video output interface 150 via video link 158 so as to receive a provided video output signal. Examples of other suitable display devices include, but are not limited to, PDA displays, displays of other portable devices, televisions, computer monitors, and so forth.

Similarly, computing system 100 may also include audio output interface 155, which may provide an audio output signal to external audio output devices, such as audio system 156. The computing system 100 may be integrally positioned with or separate from the audio system 156, which may include a speaker or other device capable of emitting sound data. The audio system 156 may be coupled to audio output interface 155 so as to receive a provided audio output signal. Non-limiting examples of suitable audio systems include stereo systems, amplifiers, radios, television audio systems, and so forth.

Computing system 100 may also include mass storage interface 160, which is configured to read data from and to write data to a mass storage device, such as, for example, a magnetic disk storage device (e.g., a Digital Video Disk (DVD), a Compact Disk (CD)), an optical disk storage device, and a computer hard disk drive. A mass storage device may be coupled to mass storage interface 160 so as to enable the reading and writing of data. When a mass storage device is coupled to mass storage interface 160, one or more program modules including operating system 141, application programs 142, other program modules 143, and program data 144 may be stored in the mass storage device.

Computing system 100 may include network interface 180, through which computing system 100 may receive data from or transmit data to external sources, such as for example, a remote computing system 182 or database. The computing system 100 and the remote computer system 182 may be network connectable to Local Area Networks (LANs) and Wide Area Networks (WANs), such as the Internet, that include external computing systems and databases. The computing system 100 may be connected with the remote computer system 182 through any suitable network communication link 184, as described below. The remote computer system 182 may also be connected to the computer system 100 through a serial port interface 190 and an appropriate modem communication link 194 via modem 192. In one embodiment, the remote computer system 182 may include a TV broadcast station, a cable broadcast station, and a satellite transmission system. The broadcast signals transmitted to between the computing system 100 and the remote computer system 182 may include analog and digital signals that are transmitted over any suitable communication link.

As defined herein, the term "communication link" includes any communication path that may enable the transport of electronic data between two entities such as computing systems or modules. The actual physical representation of a communication path between two entities is not important and may change over time. A logical communication link may include portions of a system bus, a local area network, a wide area network, the Internet, combinations thereof, or portions of any other path that may facilitate the transport of electronic data. Communication links may include hardwired links, wireless links, or a combination of hardwired links and wireless links. Communication links may also include software or hardware modules that condition or format portions of data so as to make them accessible to components that implement the principles of the present invention. Such components may include, for example, proxies, routers, firewalls, or gateways. Communication links may also include portions of a Virtual Private Network ("VPN").

While FIG. 1 and the corresponding discussion provide a general description of a suitable computing system in which the invention may be implemented, it will be appreciated that the features of the present invention, as disclosed herein, may be practiced in association with a variety of different system configurations.

Figure 2:
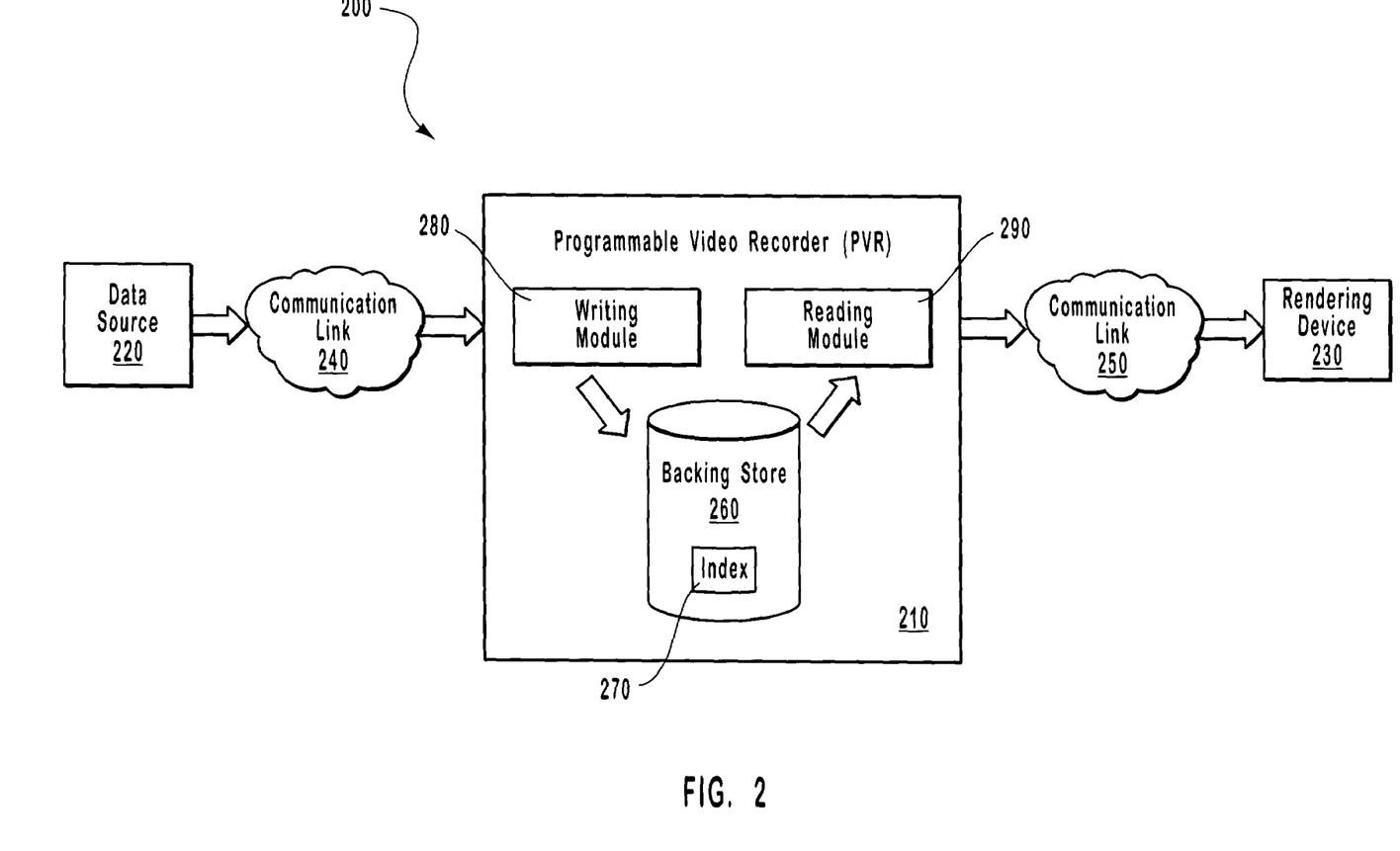
FIG. 2 illustrates a network environment in which a computing system is connected to a data source and a rendering device.

FIG. 2 illustrates one embodiment of an environment 200 that may be used to practice the invention. As shown, a Programmable Video Recorder (PVR) 210 is in communication with a data source 220 and a rendering device 230 through corresponding communication links 240 and 250.

The data source 220 may include a remote computer system, such as remote computer system 182 of FIG. 1. The data source 220 may also include a broadcast station, a cable station, a radio station, a satellite, a WAN, a LAN, and any other data source that is configured to transmit (e.g., broadcast) data to the PVR. Although only a single data source 220 is shown, the network environment 200 may also be configured with two or more data sources that are configured to transmit data to the PVR 210.

The rendering device 230 may include any device that is configured to communicate with the PVR and to render or otherwise play the broadcast data that is transmitted to the PVR. The rendering device 230 may include, for instance, monitor 157, audio system 156, or remote computer system 182 of FIG. 1. The rendering device 230 may be located locally or remotely from the PVR 210. Although only a single rendering device 230 is shown, the network environment 200 may also be configured with two or more rendering devices that are configured to render the data made available by the PVR 210. The principles of the present invention may also be practiced in environments that do not include rendering devices.

The communication links 240 and 250 that exist between the data source 220 and the rendering device 230 may include any hardwired links, wireless links, or combinations of hardwired links and wireless links, as described above. For instance, the communication links 240 and 250 may include TV, Cable, and Satellite communication links. In one embodiment, the rendering device 230 is located locally and integrally with the PVR 210, such that the communication link 250 may also only comprise computer modules.

As shown, the PVR 210 also includes a backing store 260 that is configured to store data, such as broadcast data and enhanced file-state data. The backing store 260 may include volatile and non-volatile storage. According to one embodiment, the backing store 260 also includes an index 270 that is configured to associate the enhanced file-based data with corresponding times for rendering the enhanced file-based data based on an intended presentation sequence of the data. An embodiment of the index 270 is described in more detail below in reference to FIG. 5.

The PVR 210 is also shown to include a writing module 280 and a reading module 290 for writing data and reading data in the backing store 260 respectively. In one embodiment, the writing module 280 is configured to receive data from the data source 220 and to write the data to the backing store 260, while being able to distinguish between enhanced file based data and broadcast multimedia data. This is useful for enabling the writing module 280 to create index 270 and for indexing the enhanced file-based data with respect to the broadcast data, as described herein.

The reading module 290 is configured to access data stored in the backing store 260 so that it can be rendered by the rendering device 230. The reading module 290 is also configured to access the index 270 to determine what enhanced file-state data, if any, should be rendered with the broadcast data. In one embodiment, as described below, the determination of what enhanced file-state data is to be rendered is made according to the presentation timestamps of the broadcast data that are associated with timestamps of the enhanced file-state data.

As described above, a viewer who is watching a program of a baseball game may wish to temporarily pause the game to perform an errand, during which time the program continues to be recorded to the backing store 260. Upon return, the viewer can then resume watching the portions of the program that were recorded while the program was temporarily paused. The viewer may also time-shift the display of a program by fast-forwarding or rewinding to a desired point in a program. For instance, a viewer may wish to fast-forward over commercials. Time-shifting a program, in the foregoing manner, is beneficial for providing a viewer with the convenience of being able to control how and when a program is played.

When a program that includes enhanced file-state data, such as ATVEF data, is time-shifted (e.g., played in a different time than it was broadcast), the file-based state information may become invalidated, as described above. The present invention overcomes some of the aforementioned problems by utilizing an index 270 to associate the enhanced file-state data with appropriate presentation times for rendering the enhanced file-state data with the corresponding broadcast data. As described herein, this generally enables the file-based data to remain current and up-to-date with the presentation time of the corresponding broadcast data.

Figure 3:
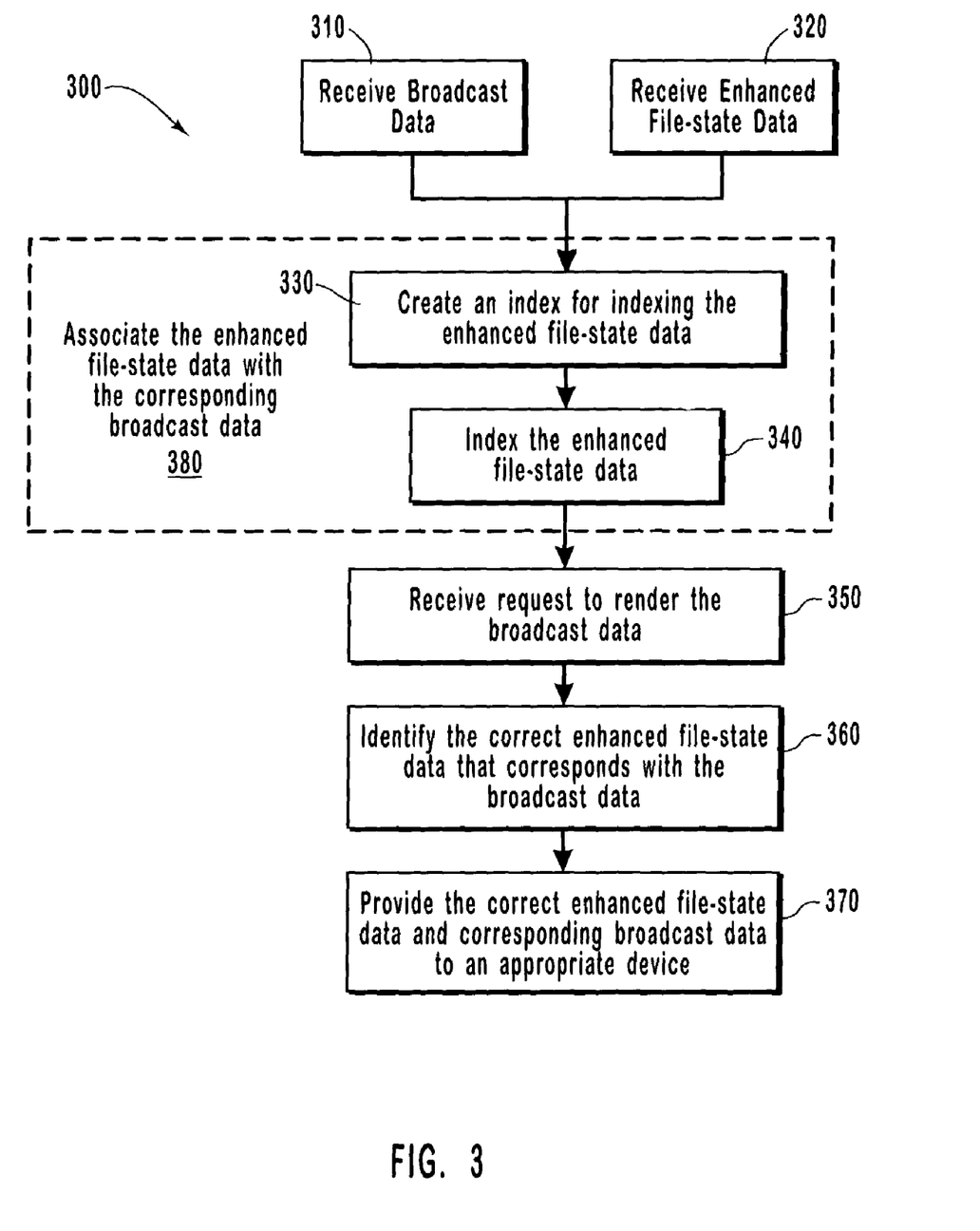
FIG. 3 is a flow diagram illustrating an example of one method for writing multimedia data to the storage medium of the computing system.

FIG. 3 shows a flowchart 300 of one embodiment of a method in accordance with the present invention. As shown, the method includes various acts (acts 310, 320, 330, 340, 350, 360 and 370) and a step 380 that may be performed by the PVR for enabling enhanced file-state data to be time-shifted. In one embodiment, the PVR receives broadcast data (act 310) and enhanced file-state data (act 320). The broadcast data and the enhanced file-state data may be received in the same media stream or in different media streams. The broadcast data and the enhanced file-state data may also be received at very different times or contemporaneously. Although the broadcast data may comprise multimedia data, such as audio and video, it will be appreciated that the broadcast data may also include enhanced file-state data, such that the PVR may receive two different sets of enhanced file-state data. Accordingly, the invention is not limited to embodiments in which the broadcast data includes multimedia data.

Figure 4:
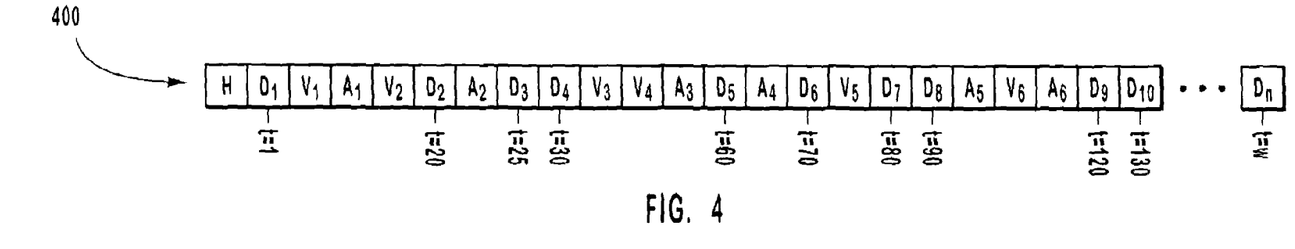
FIG. 4 illustrates one example of a data stream that includes audio and video broadcast data and enhanced file-based state data.

FIG. 4 illustrates one embodiment of a media sample 400 that is received in a streaming format from a data source. As shown, the media sample 400 includes a header (H), a plurality of video packets (V1, V2, V3, V4, V5, V6 and so forth), a plurality of audio packets (A1, A2, A3, A4, A5, A6, and so forth), and a plurality of enhanced file-state data packets (D1, D2, D3, D4, D5, D6, D7, D8, D9, D10, and so forth). Some of the aforementioned audio and video packets have been assigned timestamps (t=x, wherein x is the timestamp, and wherein x may correspond with any unit of time). The timestamps will be referenced below with respect to FIG. 5.

As shown in FIG. 4, the broadcast data (e.g., the audio and video data packets) may be received in the same media sample as the enhanced file-state data (e.g., the file-state data packets). However, the writing module 280 of the PVR 210 is configured to distinguish between the enhanced file-state data and the broadcast data. Although the present example of broadcast data includes audio and video data packets that are timestamped according to time, it will be appreciated that the broadcast data may include any data samples or packets that are stamped according to time, byte offset, or other sequencing marks. Accordingly, the invention is not limited to embodiments in which the broadcast data comprises audio and video data that is timestamped.

As shown in FIG. 3, the next acts of the present method include the acts of creating an index for indexing the enhanced file-state data (act 330) and the act of indexing the enhanced file-state data (act 340). Acts 330 and 340 are shown, in the present embodiment, to be included with the step for associating the enhanced file-state data with the corresponding broadcast data (step 380). However, it will be appreciated that step 380 may include any corresponding acts that are sufficient for associating the file-state data with the appropriate broadcast data. For instance, in one embodiment, step 380 may be accomplished by performing the act of associating timestamps of the enhanced file-state data with the presentation timestamps of the corresponding broadcast data so that the corresponding data is played at the same time. This may be accomplished, for example, with the use of an index, as described below.

The creation of an index (act 330) may be preformed figuratively by associating the enhanced file-state data with the corresponding broadcast data in any suitable manner, or literally with the use of fields that characterize the enhanced file-state data.

Figure 5:
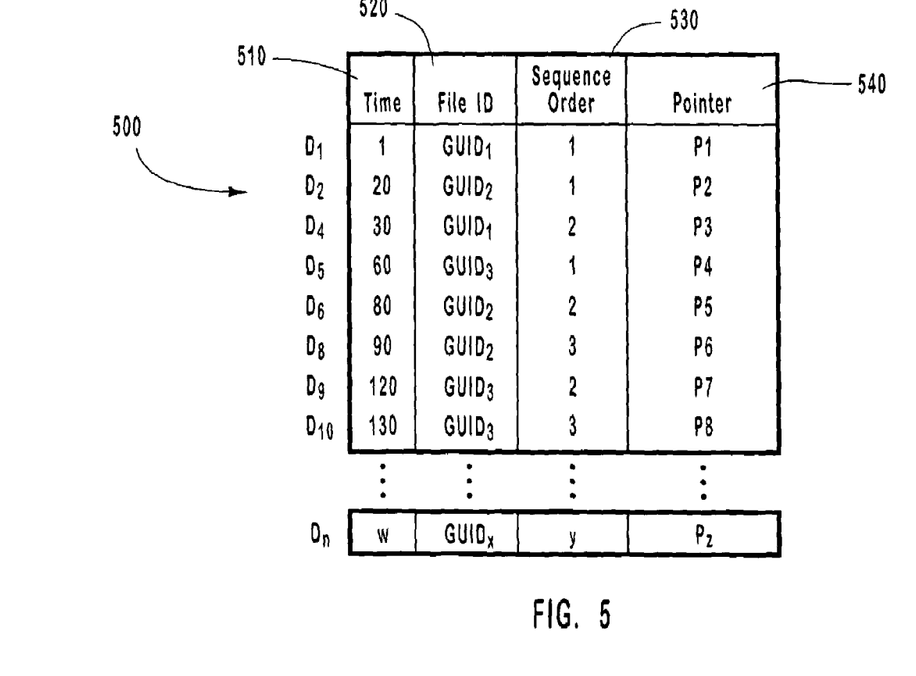
FIG. 5 illustrates one example of an index for indexing the enhanced file-based state data of the data stream shown in FIG. 4.

FIG. 5 illustrates one example of an index 500 that may be created for indexing the enhanced file-state data (act 330). As shown, the index 500 includes various fields for indexing the enhanced file-state data (act 340). In the present embodiment, the fields include a time field 510, a file ID field 520, a sequence order field 530, and a pointer field 540.

The time field 510 corresponds with a timestamp that is assigned to the data samples. The timestamps that are assigned to each of the file-based data samples may be assigned upon receipt, prior to receipt, or subsequent to receipt by the PVR. The timestamps are used to determine what file-state information is current with respect to the broadcast data that is being played.

In other embodiments, when the data samples are stamped according to sequencing methods other than by time, or in addition to time (e.g., by byte offset or by a sequence number), the appropriate sequencing identifiers for sequencing the data samples may also be indexed in appropriate fields and used to help perform the methods of the invention.

The file ID 520 may include any identifier for identifying one or more files that are grouped together. For instance, a file ID 520 may include a GUID. GUIDs are well-known to those of ordinary skill in the art. The file ID 520 may also include a file name or a data source identifier. In the present embodiment, the file ID includes GUIDs that are associated with the file-state data that is received from data sample 400. In this embodiment, data samples D1, D3, D4, and D7 all correspond to a first GUID (i.e., GUID1), data samples D2, D6 and D8 all correspond to a second GUID (i.e., GUID2), and data samples D5, D9 and D10 correspond to a third GUID (i.e., GUID3). Data samples D3 and D7 are not shown in the index 500 because they are duplicative, as described below.

The sequence order 530 includes the sequence in which the data sample occurs within the GUID. The sequence order 530 may be useful for helping to eliminate the duplicative efforts of storing redundant data. For instance, in the present example, if data sample D3 was tagged as a first data sample assigned to GUID1, then it could be determined that data sample D3 was duplicative of data sample D1 and should therefore be deleted. By deleting data sample D3, the PVR is able to conserve resources. In similar fashion, data sample D7 could be deleted if it was determined that data sample D7 was assigned as the second data packet of GUID1 because it would be duplicative of data sample D4.

The pointer 540 may include any pointer, marker, address or other reference to enhanced file-state data. The pointer may point to data stored in the backing store of the PVR or to information that is accessible by the PVR, such as, for example data that is accessible through the Internet. During use, the reading module may determine where enhanced filed-state data is according to the pointer. The reading module 290 may then access the information and transmit it to an appropriate rendering device. Accordingly, the index may be used to help to speed presentation of the data by helping to quickly locate associated data that is already assembled, rather than having to reassemble the associated data. According to one alternative embodiment, the reading module 290 may merely inform a rendering device where the information is located so that the rendering device 230 can access the information.

Returning to FIG. 3, the method also includes the act of receiving a request to render the broadcast data (act 350). For instance, in the present embodiment, a viewer may request for any portion of a broadcast presentation to be rendered. If the requested portion of the broadcast is buffered within the backing store of the PVR, then the PVR can access and render the requested portion of the broadcast. However, if the requested portion of the broadcast is not yet received or if it has already been overwritten, then the PVR will be unable to access the requested broadcast data.

When the PVR is able to access the requested broadcast data, the present method includes the act of identifying the correct enhanced file-state data that corresponds with the broadcast data (act 360). As mentioned above, this may be accomplished by comparing and synchronizing timestamps of the enhanced file-state data with the timestamps of the corresponding broadcast data. An example will now be provided to emphasize the utility of synchronizing the enhanced file-state data with the broadcast data.

For instance, in one embodiment a viewer records an entire baseball game that includes a scoreboard that is updated with enhanced file-state data, such as with the data samples D1, D2, D3 and so forth that are shown in FIGS. 4 and 5. In this embodiment, the c: 0 3 M S t viewer now decides to begin watching the game at a point that corresponds with timestamp t=35. However, when a reader begins to read the data sample at t=35 then there is no corresponding file-state data sample to update the scoreboard. Accordingly, the scoreboard may reflect the data corresponding with data sample Dn, which is the final score, since data sample Dn was the last received and most current data sample as far as the PVR is concerned. This is a problem because the viewer may not want to see the final score until the end of the game.

The present method enables the correct enhanced file-state data to be reflected by determining which enhanced file-state data is properly associated with the corresponding broadcast data. In the present embodiment, if the broadcast data that is playing corresponds to a time of t=35, then the index is searched to identify which of the enhanced file-state data samples are valid at a time of t=35. According to one embodiment, every data sample that is associated with a timestamp of greater than t=35 is invalidated. Accordingly, only data samples D1, D2 and D4 may be valid (recall that D3 was duplicative and thus not recorded or indexed). Depending on the configuration of the index 500, any combination of the data samples D1, D2 and D4 may be valid.

For instance, if data sample D4 overwrites data sample D1 then data sample D4 is the most current. Alternatively, data sample D4 may only be supplemental to data sample D1, such that data sample D1 and D4 are both valid. Data sample D2 may also be valid or invalid depending on any expiration time that may be associated with data sample D2. For instance, although not shown, data sample D2 may be associated with an expiration time of t=30, such that at time t=35 data sample D2 is invalid.

It can be seen how according to the present method, the enhanced file-state data can be kept synchronized with the broadcast data to which it corresponds. For example, if the data samples D1 and D4 correspond with runs scored by the home team thru time t=30 and the data sample D2 corresponds with the runs scored by the visiting team through time t=30, then the PVR will be able to provide the viewer with the appropriate score at time t=30, rather than simply relying on the most recently received scoring data at time t=w from data sample Dn.

Although the previous example has gone into some detail regarding the fields of the index 500, it will be appreciated that the foregoing example of the index 500 is merely illustrative and should not therefore be construed as limiting the scope of the invention. In particular, the index 500 may also include additional fields for indexing the IP address of the file-state data, fields for indexing URLs associated with the file-state data, fields for identifying the total number of packets within a GUID, fields corresponding to expiration times of the file-state data, and other fields for characterizing other information about the file-state data, and fields for identifying a sequencing identifiers of the data samples (e.g., byte offset, sequence number, and so forth).

As illustrated in FIG. 4, the final act of the present embodiment is to provide the correct enhanced file-state data with the corresponding broadcast data to an appropriate device (act 370). The broadcast data can be provided by either reading the broadcast data from the backing store and transmitting it to the appropriate device, such as a rendering device, or by merely informing the appropriate device where the data is located so that the appropriate device can access the broadcast data directly. Similarly, the enhanced file-state data can be provided, upon identifying the correct enhanced file-state data (act 360), by reading the enhanced file-state data and transmitting it to the appropriate device. Alternatively, the PVR may simply allow the appropriate device to access to the index and reference the appropriate pointer to access the enhanced file-state data by itself.

Upon providing the correct enhanced file-state data and the corresponding broadcast data to the appropriate device, then the PVR continues to read the recorded enhanced file-state data and broadcast data from the backing store. As new data is read, the file-state data is updated with newly encountered file-state data, thereby maintaining a current state of the file-state data.

In summary, the invention provides a means for enabling enhanced file-state data to be time-shifted and in a manner that keeps the enhanced file-state data current with respect to the playback of the corresponding broadcast data. As described herein, the invention may also help to speed presentation of seeked data within the presentation by helping to quickly locate associated data that is already assembled, rather than having to reassemble the associated data.

Accordingly, the described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system that receives broadcast data and enhanced file-state data from a data source, the computing system including a storage medium configured for buffering both of the broadcast data and the enhanced file-state data, a method for enabling the broadcast data to be rendered at a playback time that is different than a time in which the broadcast data is received and with correct enhanced file-state data, even when the correct enhanced file-state data is received at a different time than the time in which the broadcast data is received, the method comprising:

an act of a client system receiving and recording broadcast data and enhanced file-state data that is received from a data source, wherein an intended presentation time of the enhanced file-state data corresponds with an intended presentation time of the broadcast data;

an act of the client system creating an index that is configured to index the enhanced file-state data relative to the intended presentation of corresponding broadcast data, even when a timestamp of the enhanced file-state data is different than a timestamp of the received broadcast data, wherein each entry in the index includes a first data field corresponding to a timestamp, a second data field corresponding to a file identifier, a third data field corresponding to a sequence order and a forth field corresponding to a pointer;

an act of the client system indexing the enhanced file-state data within the index created by the client system and relative to the intended presentation of the corresponding broadcast data and such that time-shifted playback of the broadcast data and the enhanced file-state data will be synchronized, and even when the timestamp of the enhanced file-state data is different than the timestamp of the received broadcast data and even in situations when new enhanced file-state data has been received that provides an effective update to the previously recorded file-state data;

an act of the client system receiving a request to render the broadcast data at a playback time that is different than a time in which the broadcast data was received;

an act of the client system identifying, via the index, correct enhanced file-state data that corresponds with the intended presentation of the corresponding broadcast data and which includes identifying the previously recorded enhanced file state data to be displayed with the broadcast data corresponding to the previously recorded enhanced file state data, rather than updated enhanced file-state data, and even in situations when subsequent updates have been received for the previously recorded enhanced file-state data; and an act of the client system providing the correct enhanced file-state data and the broadcast data to an appropriate rendering device, such that the broadcast data can be rendered with the correct enhanced file-state data, and even when the timestamp of the enhanced file-state data is different than a timestamp of the received broadcast data.

2. A method as recited in claim 1, wherein the broadcast data includes multimedia data.

3. A method as recited in claim 1, wherein the broadcast data includes streamed data that is intended for sequenced presentation, the broadcast data including at least one of TV broadcast data, movie broadcast data, music broadcast data, light show broadcast data, slide show broadcast data.

4. A method as recited in claim 1, wherein the broadcast data includes enhanced file-state data.

5. A method as recited in claim 1, wherein the enhanced file-state data includes web-based data.

6. A method as recited in claim 5, wherein the enhanced file-state data includes ATVEF data.

7. A method as recited in claim 5, wherein the enhanced file-state data includes Broadcast HTML data.

8. A method as recited in claim 1, wherein the broadcast data and the enhanced file-state data are received from the same data source.

9. A method as recited in claim 8, wherein the broadcast data and the enhanced file-state data are received from the same streaming data sample.

10. A method as recited in claim 1, wherein the enhanced file-state data comprises at least one redundant portion, and wherein the index ignores the at least one redundant portion.

11. A method as recited in claim 1, wherein the broadcast data includes broadcast data corresponding to a television program and broadcast data corresponding to commercials, and wherein the enhanced file-state data is received during commercials.

12. A method as recited in claim 1, wherein the request to render the broadcast data is received from a viewer.

13. A method as recited in claim 1, wherein the computing system includes a programmable video recorder.

14. A method as recited in claim 1, wherein the appropriate device includes a monitor.

15. A method as recited in claim 1, wherein the appropriate device includes an audio system.

16. A method as recited in claim 1, wherein prior to providing the correct enhanced file-state data to the appropriate device, the recorded enhanced file-state data is updated with new enhanced data.

17. A method as recited in claim 1, wherein the act of indexing the enhanced file-state data includes the act of indexing the enhanced file-state data by timestamp.

18. A method as recited in claim 1, wherein the act of indexing the enhanced file-state data includes the act of indexing the enhanced file-state data by file identifier, wherein the file identifier includes a GUID.

19. A method as recited in claim 1, wherein the act of indexing the enhanced file-state data includes the act of indexing the enhanced file-state data with a pointer that points to the enhanced file-state data.

20. A method as recited in claim 19, wherein the pointer points to enhanced file-state data stored in a storage medium of the computing system.

21. A method as recited in claim 1, wherein the act of indexing the enhanced file-state data includes the act of indexing the enhanced file-state data by a timestamp, a file identifier, a sequence order number, and a pointer that points to the enhanced file-state data.

22. A method as recited in claim 1, wherein the act of identifying, via the index, correct enhanced file-state data includes invalidating enhanced file-state data with timestamps older than a timestamp of corresponding broadcast data selected for playback.

23. A method as recited in claim 22, wherein the act of identifying the correct enhanced file-state data includes identifying data samples of the enhanced file-state data that have not been invalidated.

24. A method as recited in claim 23, wherein at least some data samples are associated with an expiration time that renders said at least some data samples invalid at a predetermined time.

25. A method as recited in claim 1, wherein the pointer points to content that is not stored by the client system but which is available over the Internet.

26. In a computing system that receives broadcast data and enhanced file-state data from a data source, the computing system including a storage medium configured for buffering both of the broadcast data and the enhanced file-state data, a method for enabling the broadcast data to be rendered at a playback time that is different than a time in which the broadcast data is received and in a sequence that is different than the sequence in which the broadcast data is received and wherein the broadcast data is rendered with correct enhanced file-state data, even when the correct enhanced file-state data is received at a different time than the time in which the broadcast data is received, the method comprising:

an act of a client system receiving and recording broadcast data and enhanced file-state data from a data source, wherein an intended presentation time of the enhanced file-state data corresponds with an intended presentation time of the broadcast data;

a step for the client system associating the enhanced file-state data with the corresponding broadcast data, even though a timestamp of the enhanced file-state data is different than a timestamp of the corresponding broadcast data that the enhanced file-state data is intended to be rendered with;

an act of the client system receiving a request to render the broadcast data at a playback time that is different than a time in which the broadcast data was received;

an act of the client system receiving a request to skip the rendering of a portion of the broadcast data, the request effectively instructing the client system to render the broadcast data in a sequence that is different than a sequence in which the broadcast data was received;

an act of the client system identifying correct enhanced file-state data that corresponds with the intended presentation of the corresponding broadcast data and such that time-shifted and non-sequential playback of the broadcast data and the enhanced file-state data will be synchronized, even though the timestamp of the enhanced file-state data is different than the timestamp of the received broadcast data;

an act of the client system further identifying a portion of the correct enhanced file-state data corresponding to the portion of the broadcast data that was requested to be skipped; and an act of the client system providing the correct enhanced file-state data and the broadcast data to an appropriate rendering device, such that the broadcast data can be rendered with the correct enhanced file-state data, wherein the rendering device will skip the portion of the broadcast data that was requested to be skipped and wherein the rendering device will use the portion of the correct enhanced file-state data to render, after skipping the portion of the broadcast data, any data contained in the correct enhanced file-state data for the skipped portion of the broadcast data, even though the timestamp of the enhanced file-state data is different than the timestamp of the received broadcast data.

27. A method as recited in claim 26, wherein the step for associating the enhanced file-state data with the corresponding broadcast data includes the following:

an act of creating an index that is configured to index the enhanced file-state data relative to an intended presentation of corresponding broadcast data; and an act of indexing the enhanced file-state data in the index relative to the intended presentation of the corresponding broadcast data.

28. A method as recited in claim 26, wherein the broadcast data includes streamed data that is intended for sequenced presentation.

29. A method as recited in claim 28, wherein the multimedia data includes at least one of audio and video multimedia data.

30. A method as recited in claim 26, wherein the broadcast data includes enhanced file-state data.

31. A method as recited in claim 26, wherein the enhanced file-state data includes web-based data.

32. A method as recited in claim 31, wherein the enhanced file-state data includes A TVEF data.

33. A method as recited in claim 31, wherein the enhanced file-state data includes Broadcast HTML data.

34. A method as recited in claim 26, wherein the enhanced file-state data comprises at least one redundant portion, and wherein the index ignores the at least one redundant portion.

35. A method as recited in claim 26, wherein the computing system includes a programmable video recorder.

36. A method as recited in claim 26, wherein the appropriate device includes a monitor.

37. A method as recited in claim 26, wherein the appropriate device includes an audio system.

38. A method as recited in claim 26, wherein the act of indexing the enhanced file-state data includes the act of indexing the enhanced file-state data by a sequencing identifier, the sequence identifier including at least one of a timestamp, a sequence number and a byte offset.

39. A method as recited in claim 26, wherein the act of indexing the enhanced file-state data includes the act of indexing the enhanced file-state data by file identifier, wherein the file identifier includes a GUID.

40. A method as recited in claim 26, wherein the act of indexing the enhanced file-state data includes the act of indexing the enhanced file-state data with a pointer that points to the enhanced file-state data.

41. A method as recited in claim 40, wherein the pointer points to enhanced file-state data stored in a local storage medium of the computing system.

42. A method as recited in claim 40, wherein the pointer points to enhanced file-state data remote from the computing system.

43. A method as recited in claim 26, wherein the request to skip the rendering of a portion of the broadcast data comprises a request to skip the commercials during playback of the broadcast data.

44. A computer program product for implementation in a computing system that receives broadcast data and enhanced file-state data from a data source, the computing system including a storage medium configured for buffering both of the broadcast data and the enhanced file-state data, the computer program product comprising:
one or more computer-readable storage media comprising stored computer-executable instructions for implementing the method recited in claim 1.

45. A computer program product as recited in claim 44, wherein the one or more computer-readable media include system memory.

46. A computer program product as recited in claim 44, wherein the broadcast data includes streamed data that is intended for sequenced presentation.

47. A computer program product as recited in claim 44, wherein the enhanced file-state data includes web-based data.

48. A computer program product as recited in claim 47, wherein the enhanced file-state data includes A TVEF data.

49. A computer program product as recited in claim 47, wherein the enhanced file-state data includes Broadcast HTML data.

50. A computer program product as recited in claim 44, wherein the enhanced file-state data comprises at least one redundant portion, and wherein the index ignores the at least one redundant portion.

51. A computer program product as recited in claim 44, wherein the computing system includes a programmable video recorder.

52. A computer program product as recited in claim 44, wherein the act of indexing the enhanced file-state data includes the act of indexing the enhanced file-state data by a sequencing identifier.

53. A computer program product as recited in claim 52, wherein the sequencing identifier includes a timestamp.

54. A computer program product as recited in claim 44, wherein the act of indexing the enhanced file-state data includes the act of indexing the enhanced file-state data by file identifier, wherein the file identifier includes a GUID.

55. A computer program product as recited in claim 44, wherein the act of indexing the enhanced file-state data includes the act of indexing the enhanced file-state data with a pointer that points to the enhanced file-state data.

56. A computer program product as recited in claim 55, wherein the pointer points to enhanced file-state data stored in a storage medium of the computing system.

57. A computer program product for implementation in a computing system that receives broadcast data and enhanced file-state data from a data source, the computing system including a storage medium configured for buffering both of the broadcast data and the enhanced file-state data, the computer program product comprising:
one or more computer-readable storage media comprising stored computer-executable instructions for implementing the method recited in claim 26.

* * * * *